United States Patent
George et al.

(10) Patent No.: US 11,599,776 B2
(45) Date of Patent: Mar. 7, 2023

(54) IDENTIFYING MIRROR SYMMETRY DENSITY WITH DELAY IN SPIKING NEURAL NETWORKS

(71) Applicant: The George Washington University, Washington, DC (US)

(72) Inventors: Jonathan K. George, Arlington, VA (US); Volker J. Sorger, Alexandria, VA (US)

(73) Assignee: The George Washington University, Washington, DC (US)

( * ) Notice: Subject to any disclaimer, the term of this patent is extended or adjusted under 35 U.S.C. 154(b) by 896 days.

(21) Appl. No.: 16/266,765

(22) Filed: Feb. 4, 2019

(65) Prior Publication Data
US 2019/0244079 A1    Aug. 8, 2019

Related U.S. Application Data

(60) Provisional application No. 62/625,752, filed on Feb. 2, 2018.

(51) Int. Cl.
*G06N 3/04* (2006.01)
*G06N 3/049* (2023.01)
*G06N 3/067* (2006.01)

(52) U.S. Cl.
CPC ........... *G06N 3/049* (2013.01); *G06N 3/0481* (2013.01); *G06N 3/0675* (2013.01)

(58) Field of Classification Search
CPC ........ G06N 3/049; G06N 3/0481; G06N 3/04; G06N 3/0675; G06N 3/067; G06N 3/063; G01J 11/00; G06E 3/005; G06E 3/00
See application file for complete search history.

(56) References Cited

U.S. PATENT DOCUMENTS

2015/0046383 A1*  2/2015  Hunzinger ............. G06N 3/049
                                                                            706/25

OTHER PUBLICATIONS

Calmes "Biologically Inspired Binaural Sound Source Localization and Tracking for Mobile Robots", 2009, PhD Thesis, RWTH Aachen University, pp. 143.*
Oros et al. "Evolution of Bilateral Symmetry in Agents Controlled by Spiking Neural Networks", IEEE, 2009, pp. 8.*
(Continued)

*Primary Examiner* — Li Wu Chang
(74) *Attorney, Agent, or Firm* — Blank Rome LLP

(57) ABSTRACT

The ability to rapidly identify symmetry and anti-symmetry is an essential attribute of intelligence. Symmetry perception is a central process in human vision and may be key to human 3D visualization. While previous work in understanding neuron symmetry perception has concentrated on the neuron as an integrator, the invention provides the coincidence detecting property of the spiking neuron can be used to reveal symmetry density in spatial data. A synchronized symmetry-identifying spiking artificial neural network enables layering and feedback in the network. The network of the invention can identify symmetry density between sets of data and present a digital logic implementation demonstrating an 8×8 leaky-integrate-and-fire symmetry detector in a field-programmable gate array. The efficiency of spiking neural networks can be harnessed to rapidly identify symmetry in spatial data with applications in image processing, 3D computer vision, and robotics.

15 Claims, 11 Drawing Sheets

(56) References Cited

OTHER PUBLICATIONS

A. N. Tait, et al . . . "Broadcast and Weight: An Integrated Network for Scalable Photonic Spike Processing", Journal of Lightwave Technology, vol. 32, No. 21, Nov. 1, 2014, 13 pgs.

J. Wagemans, "Characteristics and Models of Human Symmetry Detection", Wagemans—Symmetry Detection, Trends in Cognitive Sciences, vol. 1, No. 9, Dec. 1997, 7 pgs.

H. Zabrodsky, et al., "Symmetry as a Continuous Feature", IEEE Transactions on Pattern Analysis and Machine Intelligence, vol. 17, No. 12, Dec. 1995, pp. 1154-1166.

T. Zhu, "Neural Processes in Symmetry Perception: a Parallel Spatio-Temporal Model", Biol. Cybern, 2014, vol. 108, pp. 121-131.

J. George, et al., "Identifying Mirror Symmetry Density with Delay in Spiking Neural Networks", 23 pgs.

S. J. M. Rainville, "The Spatial Mechanisms Mediating the Perception of Mirror Symmetry in Human Vision", Department of Psychology, McGill University, Montreal, Oct. 1999, 236 pgs.

W. Hong, et al., "On Symmetry and Multiple-View Geometry: Structure, Pose, and Calibration from a Single Image", International Journal of Computer Vision, vol. 60, No. 3, 2004, pp. 241-265.

E. M, Izhikevich, "Polychronization: Computation with Spikes", Article—Communicated by Peter Thomas; Neural Computation; vol. 18, 2006, pp. 245-282.

Y. Keller, et al., "An Algebraic Aporoach to Symmetry Detection", IEEE—Proceedings of the 17th International Conference on Pattern Recognition, 2004, 4 pgs.

P. Konig, et al., "Integrator or Coincidence Detector? The Role of the Cortical Neuron Revisited", TINS, vol. 19, No. 4, 1996, 8 pgs.

W. A. Rosenblith, "Autocorrelation, a Principle for the Evaluation of Sensory Information by the Cenlial Nervous System", Sensory Communication, 2012, 14 pgs.

B. Sengupta, et al., "Power Consumption During Neuronal Computation", Proceedings of the IEEE, vol. 102, No. 5, May 2014, pp. 738-750.

G. Marola, "On the Detection of the Axes of Symmetry of Symmetric and Almost Symmetric Planar Images", IEEE Transactions on Pattern Analysis and Machine Intelligence, Jan. 1989, vol. 11, No. 1, pp. 104-108.

T. Sawada, et al., "Detecting 3-D Mirror Symmetry in a 2-D Camera Image for 3-D Shape Recovery", Proceedings of the IEEE, vol. 102, No. 10, Oct. 2014, 19 pgs.

Y. Prut, et al. "Spatiotemporal Structure of Cortical Acitivy: Properties and Behavioral Relevance", The Americal Physiological Society, 1998, pp. 2857-2874.

A. Leonardis, et al., Computer Vision ECCV 2006:, 9th European Conference on Computer Vision, Graz, Austria, May 2006, Proceedings, Part II, 676 pgs.

* cited by examiner

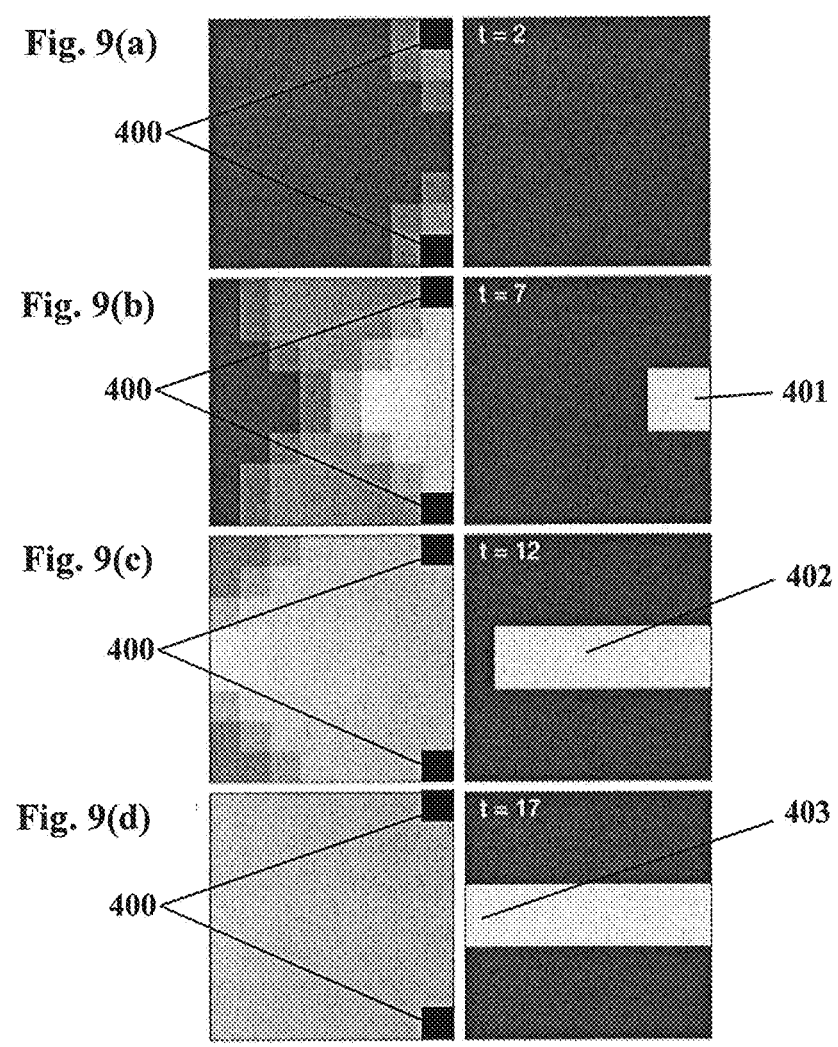

Fig. 10(a) 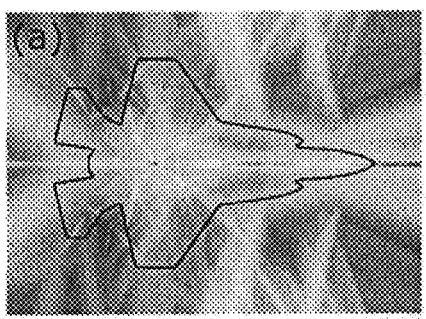 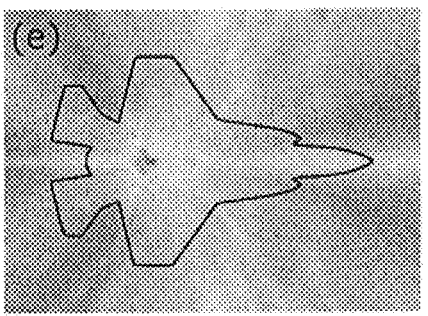 Fig. 10(e)
Fig. 10(b) 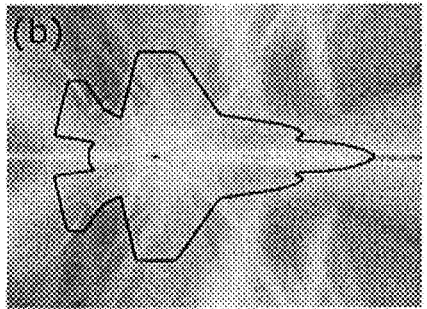 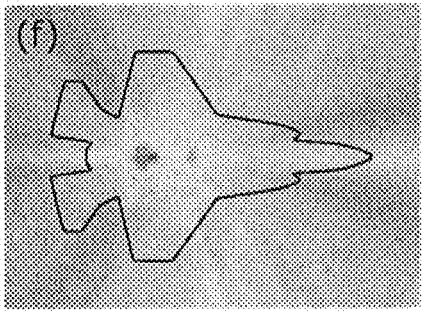 Fig. 10(f)
Fig. 10(c) 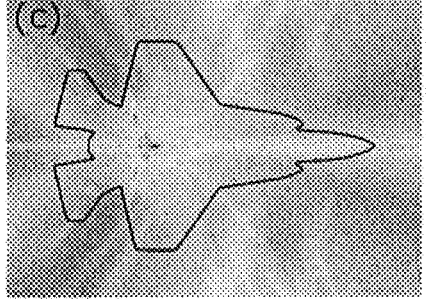 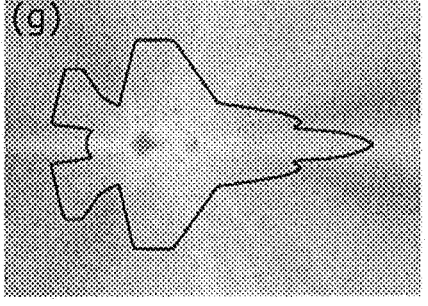 Fig. 10(g)

IDENTIFYING MIRROR SYMMETRY DENSITY WITH DELAY IN SPIKING NEURAL NETWORKS

RELATED APPLICATIONS

This application claims the benefit of U.S. Provisional Application No. 62/625,752, filed Feb. 2, 2018, the entire contents of which are incorporated herein by reference.

BACKGROUND OF THE INVENTION

Field of the Invention

The present invention relates to symmetry detector logic.

Background of the Related Art

The human visual system can detect mirror symmetry rapidly [13]. Furthermore, symmetry detection in human vision is hypothesized to be essential for 3D visualization [10]. Symmetry preference is also found in insects and birds. These examples point to a neurological origin of symmetry detection. While line integration has been proposed as a method for symmetry perception in human vision [1] and in spiking neural networks [15], a more fundamental role may be played by neural coincidence detection; in biology the spiking neural networks of the brain have been shown to be capable of both integration and coincidence detection [9, 5].

These spiking neurons have been observed to fire in a time-dependent manner forming strongly connected clusters [8] known as polychronous neural groups (PNGs) [1]. Both pattern recognition and computing have been achieved in artificial neural networks with polychronous behavior [3]. However, the connection between symmetry and coincident spiking polychronous neural networks has not been explored, nor has symmetry detection using only single layer delay in spiking artificial neural networks been demonstrated. While many algorithms for finding symmetry in images and feature sets of images have been developed [6, 2, 4, 7, 14], it is difficult to translate them to run on power-efficient neuromorphic hardware platforms.

Symmetry can be broadly defined as a self-similarity in logic or a dataset. Geometric symmetries are self-similarities in a spatial dataset. A geometric mirror symmetry is a symmetry across an axis. A geometric scaling symmetry is a symmetry of differing size. Similarly, a geometric rotational symmetry is a symmetry of rotation around a point. A geometric symmetry may include any combination of these transforms. In this paper, our focus is on geometric mirror symmetry which has been hypothesized to play an important role in human visual processing [10]. Spatial self-similarity implies a transform of some subset of the data in a space will result again in the same subset of data. If the transform is folding the space, then both subsets of data will be equidistant to the folding line.

SUMMARY OF THE INVENTION

The invention presents a formal definition of geometric symmetry as the amplitude of a tensor space of the distribution of distance. We then show how a specific configuration of a spiking neural network can act on its inputs in, a manner identical to a threshold applied to the tensor symmetry space, producing an output spike at the points of high mirror symmetry. As an example, we demonstrate a simple network both in software and in a Field Programmable Gate Array (FPGA) and validate symmetry-recognition capability of an artificial spiking neural network. The symmetry-associating behavior of spiking neural networks has immediate applications in image processing and is consistent with our intuition that the ability to identify symmetry is indeed supported by neural intelligence.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 6(c) is subtracted from the original, or generated with inhibitory spiking in a spiking neural network, FIG. 6(b) to obtain the intra-set only result, FIG. 6(d).

FIG. 7(b) shows the Manhattan space favoring coordinate-parallel and coordinate-diagonal lines, as expected.

FIGS. 9(a)-9(d) show time-evolution output of the symmetry detection algorithm using the coincidence detection of LIF neural network implemented in a Xilinx Zynq FPGA. From two-point source data (400 in (a) of the 8×8 array), FIG. 9(a) t=2 clock cycles into the 18 clock cycle period with raw output of the accumulation register array (left) and threshold register array (right), shows identification of the line of symmetry points, 401 in FIG. 9(*b*) at t=7 threshold begins to be reached at the center points on the right. 402 in FIG. 9(*c*) at t=12 peak continues to propagate to the left, 403 in FIG. 9(*d*) peak exits the left of the array finishing a trace of a two point line between the original data points.

FIGS. 10(*a*)-10(*g*) show Gaussian noise added to each measure of distance, original, FIG. 10(*a*), standard deviation 1, FIG. 10(*b*), 2, FIG. 10(*c*), 3, FIG. 10(*d*), 4, FIG. 10(*e*), 5, FIG. 10(*f*), shows narrow lines of symmetry, for example near the nose, being dispersed, while broader symmetric point, such as the tail section, being highlighted.

FIG. 12(*b*) is a block diagram showing a node with a delay counter.

FIG. 12(*c*) is a block diagram showing a node with a routing delay.

FIG. 12(*d*) is a block diagram showing a node with a shift register delay.

DETAILED DESCRIPTION OF THE INVENTION

Figure 1:
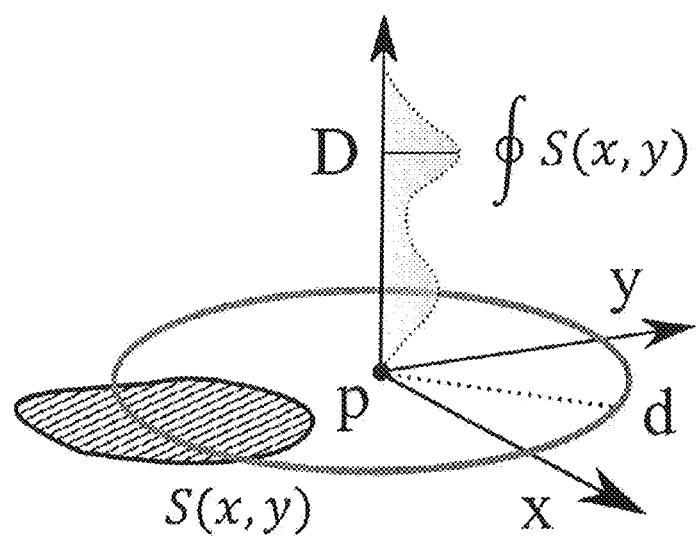
FIG. 1 represents the distribution of distances.

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

In detecting these mirror symmetries, one problem becomes detecting strong equidistant distributions of data. With this in mind, we define a tensor space D where at every point p in the space of our dataset S(x, y) the tensor describes the distribution of distance to every point in our dataset (FIG. 1). Each dimension d along the tensor at point p is defined as the contour integral of the dataset S(x, y) about a circle of radius d centered at p.

FIG. 1 represents a tensor space D describes the distribution of distances at every point p to the image data surface S(x; y), where the value at each position of the tensor $D_d$ corresponds to a distance d from point p and contains the contour integral of the surface S(x; y) around the circle at distance d from the point. In this way the tensor space D represents the density function of distances at all points in the surface to all other points in the surface. Equidistant points in the surface S(x; y) will generate peaks in the distribution along D and correspond to a symmetry density.

Definition of Mirror Symmetry Density

We define mirror symmetry density as a continuous scalar field of the peaks of the tensor D. These peaks represent positions of strong equidistance within the space of our dataset S(x, y). This is similar to definitions found in [9, 5, 8, 6, 14], except in this case the problem is posed as a maximization of equidistant density on a histogram rather than simple density in [5] and a minimization of transform energy in [9]. While both perspectives of the problem result in the same solution (the equidistant point will be halfway between two points of the image and will have the minimum transform energy), viewing the problem iii terms of maximization allows us to map the problem into a spiking neural network, where thresholds are defined in terms of peak amplitude. For a space to have symmetry density it must have some definition of distance. This distance function f, or metric, between two points (A and B) must satisfy three conditions; First, it must be positive and equal for the same point.

$$f(a,b) \geq 0 \quad (1)$$

Second, it must be coordinate-symmetric, i.e. adhering to coordinate-reversal symmetry $$f(a,b) = f(b,a) \quad (2)$$

Finally, it must satisfy the triangle inequality, $$f(a,c) \leq f(a,b) + f(b,c) \quad (3)$$

which translates into the distance between two points being the shortest path. Meeting these criteria, a function is a metric. A common metric in the Euclidean space, for example, is the definition of distance in two-dimensional Cartesian coordinates:

$$B-A = Bx-Ax2 + By-Ay2 \quad (4)$$

With this definition of distance we define the set of symmetry points, $S = \{S_1, S_2, \ldots, S_n\}$, as the point equidistant between two points A and B:

$$\exists X_j, X_k s.t. Xi-Si = Xk-Si f \text{ or } SiS, XjXk \quad (5)$$

For the two points A and B, (4) defines the set of points forming a line equidistant between the two points A and B. For, three points A, B, and C, there are three lines of symmetry formed by each of the pairs (A, B), (B, C), and (A, C) as well as possibly a single point equidistant to all three points. As the number of input points increases, the number of symmetry lines increases with the number of unique pairs of input points.

Algorithm

To understand the relationship of spiking neural networks with coincidence detection and to compare an artificial spiking neural network approach to a computational approach, it is useful to introduce an algorithmic method of ranking mirror symmetry. To develop a general algorithm to identify mirror symmetry, we first define a tensor field T where the tensor value T (x, y)=P(l) at each point in the coordinate space is a distribution of distances from that coordinate point to each input point (l). In this tensor field, high symmetry points will correspond to peaks in the distribution of distances. We define Algorithm 1 below to generate a discrete representation of this field.

With this algorithm symmetry points above a predefined threshold in the space can be identified. In O(m*n) where m is the number of points in our space S, and n the number points in the set of input points in N. We note, that this algorithm can be applied iteratively where symmetries between input points (FIG. 2(*a*)) and other symmetry points create a hierarchy of symmetry points (FIG. 2(*d*)). The expected symmetry for the four inputs (300, FIG. 2(*a*)) result in the expected (1st order) symmetry shown in FIG. 2(*c*), Algorithm 1 Mirror Symmetry Density

```
1:     function SYMMETRY(Input, BinSize)
2:         for all O_p ∈ Output[i] do
3:             D_histogram ← 0
4:             for all I_p ∈ Input[j] do
5:                 D ← ||O_p-I_p||
6:                 D_bin_index = ROUND(D, BinSize)
7:                 D_histogram_count[D_bin_index] ←
                       D_histogram_count[D_bin_index] + 1
8:             I_max ← -1
9:             C_max ← 0
10:            for all bin_count ∈ D_histogram_count do
11:                if bin_count > C_max then
12:                    C_max ← bin_count
13:                    I_max ← bin_count_index
14:            Output[i] ← C_max
15:        return Output
```

Figure 2A:
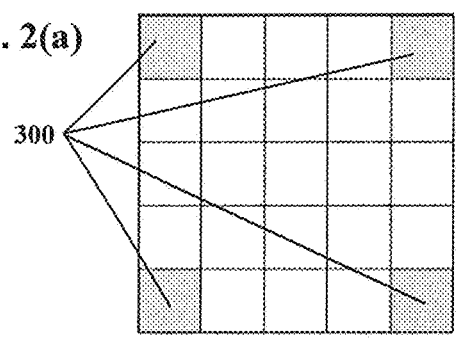
FIGS. 2(a)-2(d) show the algorithm transforms the input data points (the four corners of a Cartesian space in this example).
Figure 2B:
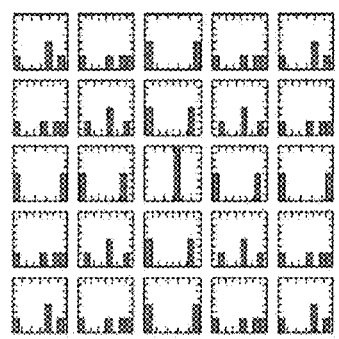
Figure 2C:
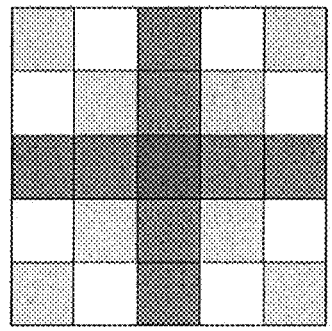
Figure 2D:
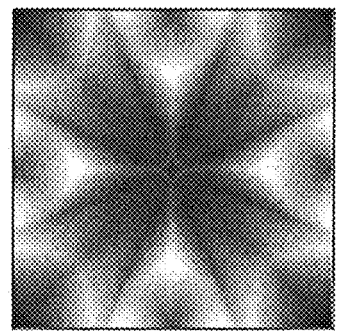

In more detail, FIGS. 2(a)-2(d) show the algorithm transforms the input data points (the four corners of a Cartesian space in this example). FIG. 2(a) shows that the input data points are transformed into an array of histograms of distances, FIG. 2(b), where each bin counts the distance from the point in space to each data point. The peaks of the set of histograms are used to create a density of symmetry, FIG. 2(c), overlaying the original space. Applying the algorithm repeatedly with feedback in a high-resolution space produces a fractal-like pattern, and FIG. 2(d) of hierarchical symmetry.

Symmetry Density in Spiking Neural Networks

Next, we show how a spiking network enables coincidence detection, which together with the above symmetry Algorithm 1 allows for a neural network implementation of symmetry detection. A spiking neural network is a type of artificial neural network that models the spiking observed in the neuron cells of the brain, in this sense it is Neuromorphic, taking on the form of a neuron. By concentrating its energy into a short time span the spike is an efficient encoding method in a noisy environment [8, 3, 11].

A simple type of spiking neural network is the Leaky Integrate and Fire (LIF) model [3]. In this model each neuron integrates each of its inputs in time while simultaneously leaking from the accumulator. When the accumulator passes a threshold level it fires, generating a signal spike. The leak creates a temporal dependence on the past, thus adding memory to the neuron. The LIF model can be formulated mathematically [3] as $$u(t) = RI(t) - T_m \frac{du}{dt} \quad (6)$$

where the voltage u is a function of current with a leaky term $$\tau_m \frac{du}{dt}$$

that depends on the change in voltage with time, and $\tau_m$ is the relaxation time constant of the signal leak to reach threshold.

Figure 3:
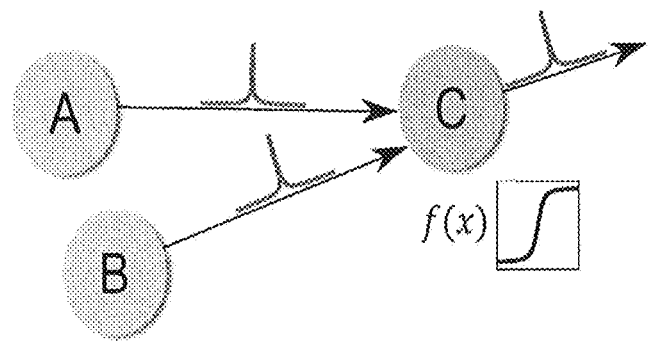
FIG. 3 shows when neuron A and neuron B fire simultaneously, and if both neurons are equidistant from neuron C, then the pulse propagating from A to C will arrive at C at the same time as the pulse propagating from B to C. The threshold at C is set such that it is higher than the amplitude of either individual pulse. Neuron C will fire if, and only if, both pulses arrive time-synchronized. In this way neuron C acts as a coincidence detector.

Referring to FIG. 3, to understand how spatial symmetry affects the result of a LIF neural network, one could consider a simple neural network consisting of two input nodes or neurons A and B connected to a single output node or neuron C. This three-neuron system acts as a coincidence detector; for a spike to propagate from neuron A to neuron C some propagation time $\Delta t_A$ must pass. Similarly, for a spike to propagate from neuron B to neuron C some propagation time $\Delta t_B$ must pass. If neuron C is assigned a threshold that is just higher than the individual spikes output from either A or B, then the neuron C will not fire unless both spikes arrive time-synchronized at C within a temporal window before the leaky time constant $T_m$ reduced the power below threshold at C. Assuming a constant propagation speed across the system, where propagation time is proportional to distance, if both neurons A and B are fired in synchronous with one another, the spike arrival times $\Delta t_A$ and $\Delta t_B$ will be dependent only on propagation distances $d_A$ and $d_B$.

In an N×N connected network, the arrival times will be distributed proportionally with distance, closer pulses arriving first and farther pulses arriving later. This is equivalent to the tensor space D of our original definition (FIG. 1). If the two distances are equal, the propagation times will be equal and the two spikes will arrive together at C, pushing it over threshold and causing it to fire. On the other hand, if the distances are not equal, the propagations times will be different, the two spikes will arrive separately at C and the neuron will not fire. In this way, synchronized neurons in spiking neural networks act as the distance-relating components in the distribution elements of our tensor space T, and the threshold at neuron C acts as the second half of our symmetry algorithm, selecting the peaks out of the distance distributions in T. This method effectively, enables the neuron to act as a coincidence detector, FIG. 3.

Figure 4:
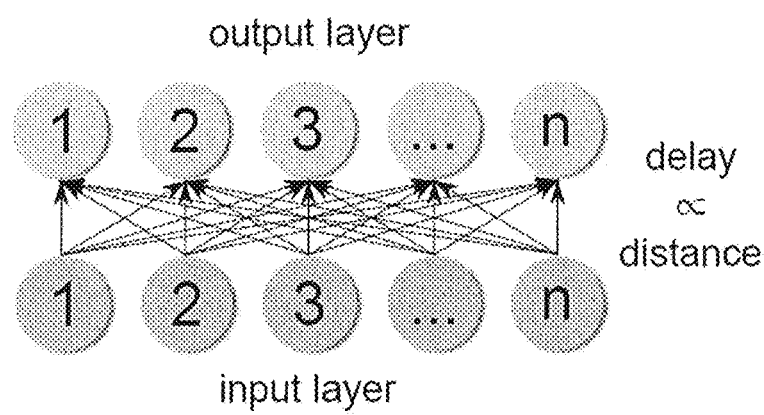
FIG. 4 shows each input layer neuron is connected to every output layer neuron with a delay proportional to the distance between the input and output points in Euclidean space. If all activated input neurons fire simultaneously, and only one pulse is allowed per cycle, the output node with highest symmetry will be the output node with the greatest number of pulses arriving simultaneously.

Turning to FIG. 4, extending upon the three-neuron system, this concept of coincidence detection via delay can be brought to the entire space. Each neuron of the input layer is connected to each neuron of the output layer (N2-2N connectivity) with a delay proportional to the distance between the two points in the space. For example, in a Cartesian space if input neuron 1 is point x=0, y=0, and output neuron 3 is the point x=5, y=4, the delay would be proportional to $\sqrt{25+16} \approx 6.4$. As stated before, the coincidence detecting property of the spiking neuron is selecting equidistant points.

The temporal response (speed) of such a system in the ultimate physical limit is defined by the sum of the input layer output delay, the pulse propagation delay, and the delay of the threshold layer. Assuming speed of light for propagation delay, the resolution of the device is set by its ability to distinguish individual pulses within the time of propagation. The worst case is the time delay of the smallest distance, given the shortest distance between individual data points in the space, i.e. the pitch of the array. Then the threshold layer must switch with at least A $d_p/c$ where $d_p$ is the pitch distance. From this we can state a lower bound for the average energy consumption of the threshold layer in the ultimate speed limit (Eq. 6).

$$E \geq \frac{\pi \hbar}{2 \Delta t} = \frac{\pi \hbar c}{2 d_p} \quad (7)$$

Layering

Deep Neural Networks (DNNs) are inherently multilayered. The multilayered architecture gives DNNs the potential to create higher levels of abstraction than single layer networks. It is reasonable to ask if the geometric-symmetry identifying neural networks discussed here are able to support layering. If we naively begin with the network of FIG. 4 and add a third layer on top of the original output layer, we quickly discover that the layering cannot be supported with the network as previously presented. While the pattern of symmetry will appear at the middle layer, each coincident set of pulses will arrive at different times. In order for geometric symmetry to be identified by coincidence detection in the top layer, input pulses (i.e. output from the middle layer) must either all start at the same time or, if initiated with time differences, these individual delays must be proportionally shorter than the respective connection delays.

If the time differences were constant we could remove time from the connection delay between the middle layer and the new output layer. However, the time differences are not predictable and are dependent on the symmetry in the data from the input layer. If we are to detect geometric symmetry in a multilayered network, we must adjust the network to account for the varying arrival times. The LIF spiking neuron can act as a memory for synchronization, much like a register in digital logic.

To see this behavior, we imagine a set of pulses independently arriving at a set of slow leaking LIF neurons such that some of the neurons receive a pulse and some do not. The pulses may represent the 1s and 0s of the bits to be stored in the memory. Now, with the proper choice of threshold, the bit will be stored until either the neuron leaks away all the energy received by the pulse or another pulse arrives, pushing the neuron over the threshold. If this second set of pulses arrives at every neuron at the same time, the neurons will act as a synchronization stage, collecting pulses from their input and waiting until activated to simultaneously release the stored pulses to their outputs.

Figure 5:
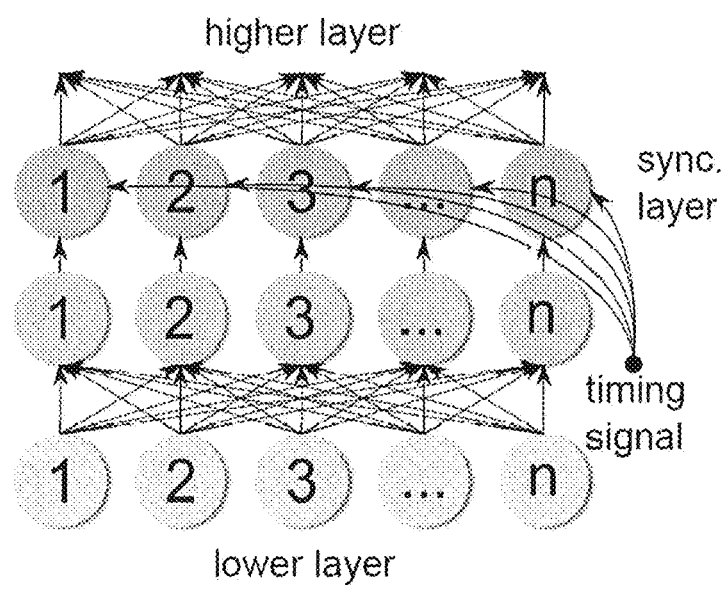
FIG. 5 shows to detect hierarchical geometric symmetry a synchronization layer is added above the original output layer. The synchronization layer has a slower integration time than the original output layer, storing the pulses until a timing signal releases them to the next higher layer simultaneously. For feedback, the output of the synchronization layer is connected back to an input layer.

Referring to FIG. 5, we can apply this concept of synchronization to the multilayered geometric symmetry-identifying network by adding a synchronization layer above the original output layer. This synchronization layer will have a slower leak rate than the layer below it so that it stores the symmetry points generated by the geometric symmetry detecting network below and, when a timing pulse arrives, release them at once to the symmetry detecting network above. In this way we can build a network to detect hierarchical geometric symmetry, i.e. the symmetry points of symmetry points.

Using the same process of synchronization, we can also feed the output layer back to the input layer. The feedback allows the network to act on the symmetry points as well as the original data. The feedback output will differ from the multilayered network, as now original data will be compared to the generated symmetry points, whereas in the multilayered network each layer only computes the geometric symmetry of the layer below it. This feedback will create a dynamic system with results similar to repeated application of the symmetry algorithm presented earlier (FIG. 2(d)).

Sets

Figure 6A:
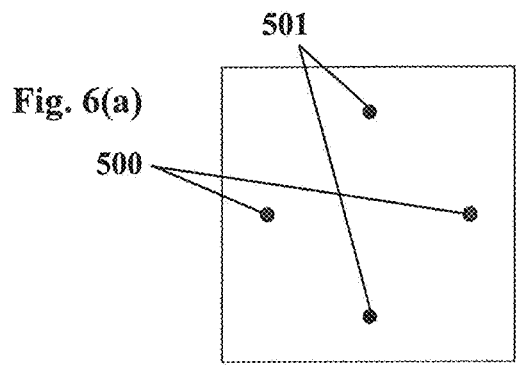
FIGS. 6(a)-6(d) show two sets of data, a first data 500 and a second data 501, FIG. 6(a) are processed by combining the inputs, FIG. 6(b), resulting in both inter-set and intra-set symmetry at the output. To obtain a result with only inter-set symmetry, two distinct pseduorandom codes are applied to the two data sets, dispersing intra-set results, FIG. 6(e). To obtain a result with only intra-set symmetry, the inter-set output
Figure 6B:
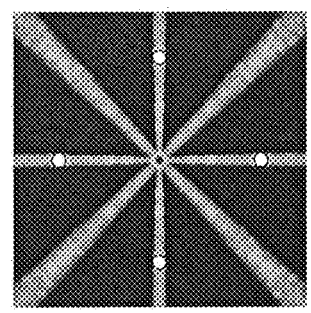

One of the primary applications of artificial neural networks is classification. Here the neural network decides the class of new input data based on prior training. In classification problems, it is often useful to compare sets of data. It may be useful in this context to, find the symmetry density within two different sets of data, inter-set symmetry, or between two different sets of data, intra-set symmetry. If we attempt to add two sets of data at the input layer, one for class A and one for class B, we will create a network that finds geometric symmetry between data in A and B but it will also find geometric symmetry from points in A to points in A and from points in B to points in B, FIG. 6(b).

Figure 6C:
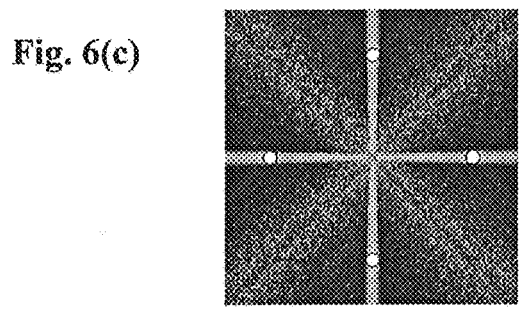

To create a network that only detects inter-set or intra-set symmetry between the two sets of data, we amend the architecture. To detect intra-set symmetry, two pseudorandom codes are generated, one for set A and one for set B. Elements of each pseudorandom code are associated with output nodes of the network. When building delays for inputs from the space of set A, the pseudorandom code for A at each associated output is added to the delay. Similarly, for the space of set B delays are added from the pseudorandom code for set B. Now pulses originating within set A will have the same random delays applied and will continue to be coincident. At the same time the delays between set A and set B will be randomized and the coincidence will be dispersed, FIG. 6(c).

Figure 6D:
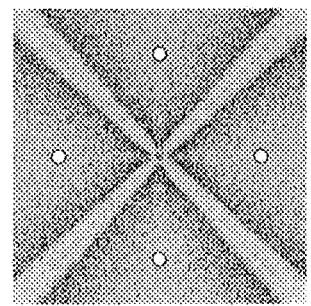

Similarly, to detect inter-set symmetry a second network is generated with connections from both sets of inputs. This results in a union of both intra-set and inter-set symmetry, FIG. 6(b). At the output of this network inhibitory connections are applied from the output of the intra-set network. This results in a reduction in spiking from the intra-set network, effectively subtracting the intra-set result from the union to create the inter-set result, FIG. 6(d).

These two techniques allow both types of set comparisons using only co-incidence detection, delay, and spike inhibition. The results can be cascaded hierarchically, as discussed previously to perform complex comparisons between many sets of data.

Metrics

Figure 7A:
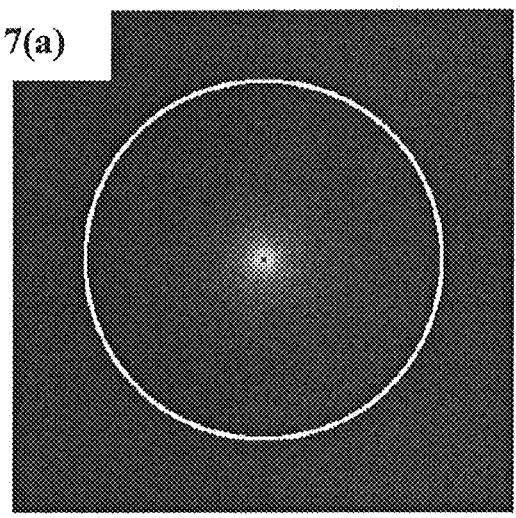
FIGS. 7(a)-7(b) show a comparison of the magnitude of symmetry density of a circle in both Euclidean space, FIG. 7(a) and Manhattan space
Figure 7B:
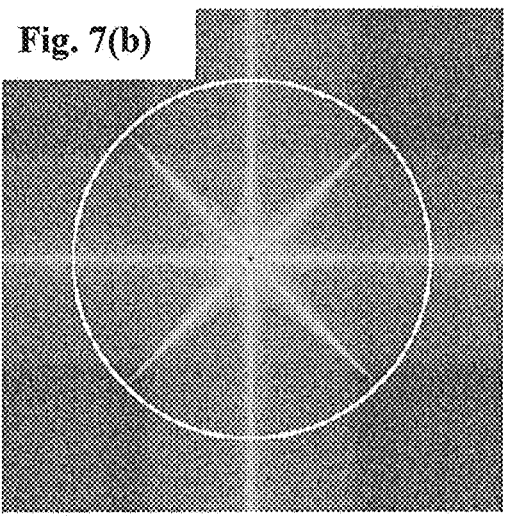
Figure 8A:
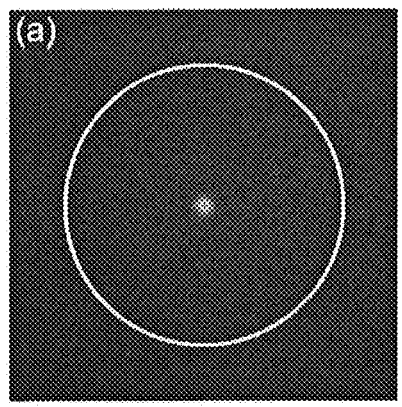
FIGS. 8(a)-8(d) show the result of an implementation of Algorithm 1 in Python for a circle, FIG. 8(a), square, FIG. 8(b), triangle, FIG. 8(c), star, FIG. 8(d), and an aircraft shows a point and fractal like mirroring of the mirror symmetry density function.
Figure 8B:
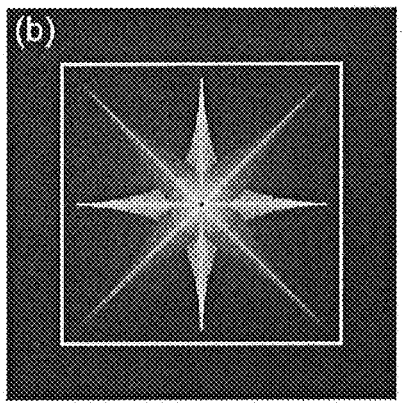
Figure 8C:
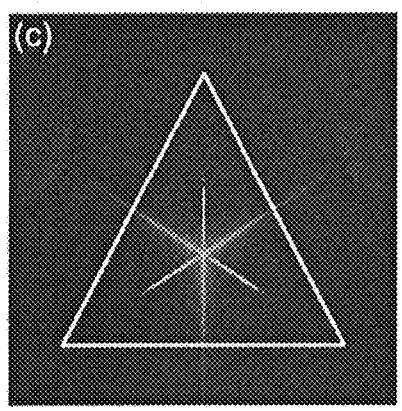
Figure 8D:
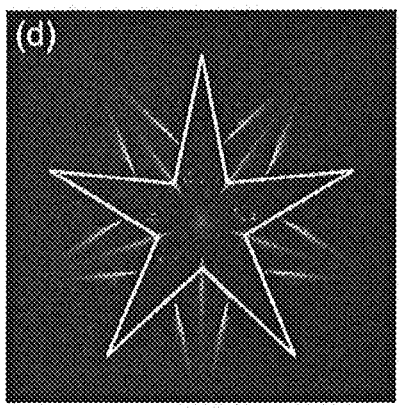
Figure 8E:
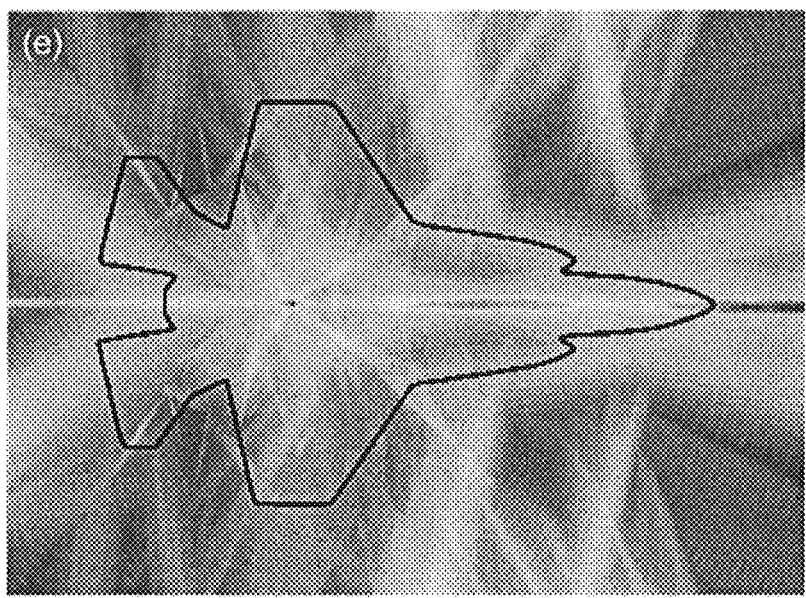

The concept of symmetry density is not limited to Cartesian coordinates or Euclidean distance. Other measures of distance can form varying types of equidistant symmetry. In the implementation of the algorithm in software, the Manhattan distance may be appealing as it can simplify the calculation of distance by eliminating the squares and square root of the Euclidean distance formula. However, this simplification has dramatic effects on the distribution of symmetry. Given points A and B in Manhattan space, a new equidistant point C can be found by moving B diagonally. In Euclidian space the equidistant point C is found by moving B circularly around point A. This has the effect of emphasizing horizontal, vertical, and diagonal lines in Manhattan space, as shown in FIG. 7.

Examples of symmetry density are shown in FIG. 8. A circle, FIG. 8(a), has a central region of high symmetry density at its center. A square, FIG. 8(b), has high symmetry density along the vertical line of symmetry, the horizontal line of symmetry, and two diagonal lines of symmetry. The triangle, FIG. 8(c), has a high density along the vertical line of symmetry as well as along two diagonal symmetry lines. The star, FIG. 8(d) has a central region of symmetry as well as folding lines of symmetry between each point of the star. A more complex shape such as the outline of a jet, FIG. 8(e), has complex symmetry density with high values around its horizontal axis and near the base of the wings.

Noise

To withstand noise, implementations of the symmetry density algorithm sets a threshold to determine which points are included in the dataset or weight the distribution with the value of the pixels. In the threshold case, the data point is either included or excluded front the distribution of distances based on whether the value of the pixel passes some threshold value. In a spiking neural network this is the activation threshold of the neuron receiving the input signal. The threshold can be set to be the mean or some standard deviation above or below the mean. In the weighting case the average value, or minimum value of the two equidistant pixels is applied as a weight to the value of the symmetry density in the same way that mass is applied as a weight in finding the center of mass of an object. This result can also be seen in long averages of a spiking neural network where the repetition of pulses is proportional to the amplitude of the input signal.

Adding noise to the input causes the addition of noise in the distance distribution, raising the noise floor of the distribution. This noise decreases the separation between the peak of the distribution and the noise floor. Once the original peak is no longer detectable in the distribution, the output point in the symmetry density will become incorrect. The strength of noise where this occurs is dependent on the Signal to Noise Ratio (SNR) of the original symmetry density.

Gaussian noise is independent of the signal and will thus have a flat distance distribution. Adding Gaussian noise to the input will have a proportional effect on the SNR of the symmetry density. Any addition of noise in dB can simply be subtracted from the SNR of the original symmetry density to determine the resulting SNR.

Gaussian noise is, however, unrealistic in most imaging systems where physically photon counting photons produces Poisson distributed noise. Unlike Gaussian noise, Poisson noise is dependent on the signal amplitude (i.e. number of photons). In this case the addition of noise will not be distributed evenly in space but will follow the inverse of the signal. That is, pixels receiving fewer photons will have greater noise than pixels receiving a greater number of photons. As the image becomes less and less exposed, the separation between the light and dark pixels diminishes until objects are no longer distinguishable. In the Poisson case images with both light and dark pixels experience both small and large noise sources simultaneously. In a thresholding implementation, on a sufficiently exposed image, the dark pixels are significantly beneath the average brightness value and will be excluded by the threshold. In this case, the symmetry density is affected primarily only effected by noise of the brightest pixels, thus favoring low-noise data. In the thresholding case only when the image exposure is reduced to the point that distribution of dark pixels and bright pixels begins to overlap will the symmetry density be affected.

Results—Python Simulation

We began with a Python simulation using a sparse matrix representation of input nodes. For each element of the output mesh, the distance to every input node is calculated using Euclidean distance and rounded into a configurable binning decimal place. The result is stored in a list. The most frequent distance in the list is found and the count of the most frequent distance is placed in the output mesh.

Results—Implementing LIF with Digital Logic

Each neuron is represented as a leaky accumulator. At each clock cycle all of the neuron inputs are added to a value stored in an accumulation register, the result of the summation minus the leak value are then stored back in the accumulation register. If the accumulation register surpasses the value of a fixed threshold, or, alternatively as a configurable threshold stored in a threshold register, the accumulator is reset to zero and a value appears at the neurons output. If the accumulation value does not surpass the threshold, zero appears at the neurons output.

Neuron-to-neuron connection delay is represented either as queue, where the outputs are placed into a First-In-First-Out (FIFO) queue, or as a pulse value and countdown register. When delay is represented as a queue, at each clock cycle a single value is added from the output neuron to each output connections FIFO and a single output is removed from each FIFO at the output neuron. The length of each FIFO is proportional to the delay being represented. When delay is represented as a countdown register, at each clock cycle if the neurons output value is positive a countdown register is initialized with a count proportional to the represented connection delay and a value of the neurons output value. At each, clock cycle each countdown register is decremented. When a countdown register reaches zero, its pulse value register is placed at the input of the output neuron.

Results—FPGA Implementation

To demonstrate spatial symmetry recognition via coincidence detection of LIF networks on actual hardware, we implemented a simple LIF spiking neural network on a Xilinx Zynq Field Programmable Gate Array (FPGA). Our LIF neural network is an 8×8 input array connected to an 8×8 neuron output array. Each output neuron is connected to every input by a shift register of length proportional to the Manhattan distance from the point (Ox,Oy) at the output to the point (Ix, Iy) at the corresponding input. This results in 4,096 shift registers with a maximum length of 16.

Each output neuron consisted of a two-stage adder followed by an accumulation register. Each adder includes a configurable constant leaky term that subtracted the configured leak from the accumulation register at each time interval. Each accumulator is connected to a threshold level. If the accumulator passes the threshold, a second single-bit register is set to 1 to indicate the output neuron producing a spike. The latency from input to output in this implementation is proportional to the length of the longest shift register, 16 in this case, plus the accumulation time, 2 in this case, for a total of 18 clock cycles. The network is clocked at a constant clock speed of 50 MHz for approximately 2.8 MHz of 8×8 symmetry operations. The output of the symmetry LIF neural network was recorded over time for the elementary case of a line between two points, as shown in FIG. 9. Our results confirm that spiking LIE neural networks indeed act as symmetry detectors, highlighting equidistant points in spatial data.

Figure 14:
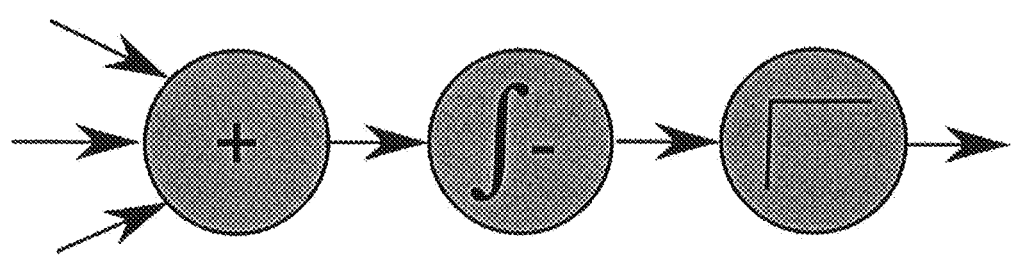
FIG. 14 shows digital logic elements of a spiking artificial neuron in a FPGA embodiment.

FIG. 14 illustrates digital logic elements of one non-limiting embodiment of the symmetry detector of the invention having a spiking artificial neuron in the FPGA. The neural network is created from an array of reprogrammable digital logic gates, and each neuron is represented as a leaky accumulator. At each clock cycle, all of the neuron inputs are added to a value stored in an accumulation register, the result of the summation minus the leak value are then stored back in the accumulation register. As illustrated in FIG. 14, in each clock cycle, from left to right, input signals arrive at the neuron. The inputs are summed at the summer (+) into a leaky-accumulator ∫−. If the accumulator value passes a threshold, a pulse is produced at the output. If the accumulation register surpasses the value of a fixed threshold or a configurable threshold stored in a threshold register, the accumulator is reset to zero and a value appears at the neuron's output. If the accumulation value does not surpass the threshold, zero appears at the neuron's output.

Neuron-to-neuron connection delay is represented either as queue, where the outputs are placed into a First-In-First-Out (FIFO) queue, or as a pulse value and countdown register. When delay is represented as a queue, at each clock cycle a single value is added from the output neuron to each output connection's FIFO and a single output is removed from each FIFO at the output neuron. The length of each FIFO is proportional to the delay being represented. When delay is represented as a countdown register, at each clock cycle if the neuron's output value is positive a countdown register is initialized with a count proportional to the represented connection delay and a value of the neuron's output value. At each clock cycle each countdown register is decremented. When a countdown register reaches zero, its pulse value register is placed at the input of the output neuron.

In yet another non-limiting embodiment of the invention, the symmetry detector can be the same as the FPGA embodiment, but implemented with digital logic in an application specific integrated circuit (ASIC). The digital logic is created by the fabrication of gates onto an integrated circuit. This fabrication may utilize standard Complementary metal-oxide-semiconductor (CMOS) technology or any other integrated circuit technology capable of forming digital logic.

In another non-limiting embodiment of the symmetry detector of the invention, a mixed signal ASIC is provided. In this implementation, the pulses of the spiking neural network are represented as analog pulses. These pulses are a combination of voltage and current flowing through an analog circuit. Delay in the neuron connections is created by path length, or a combination of capacitance, inductance, and resistance in the physical connection between the input and output neurons. The neuron is created with a simple analog comparator or one or more nonlinear components, such as amplifiers or memristors, to match the dynamic equations of a spiking neuron.

Symmetry Detector Logic

Figure 11:
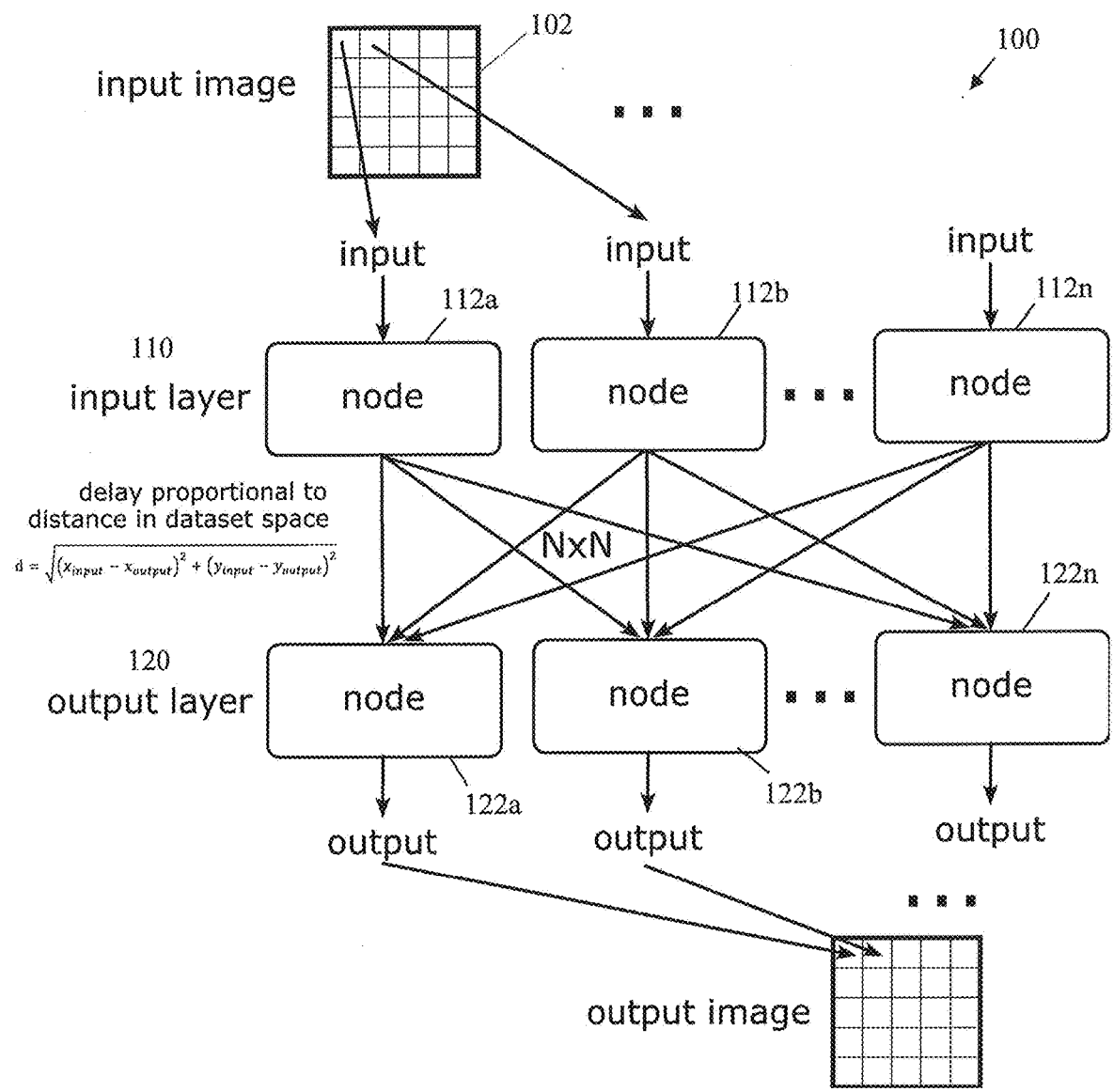
FIG. 11 is a block diagram showing a symmetry detecting neural network.
Figure 12A:
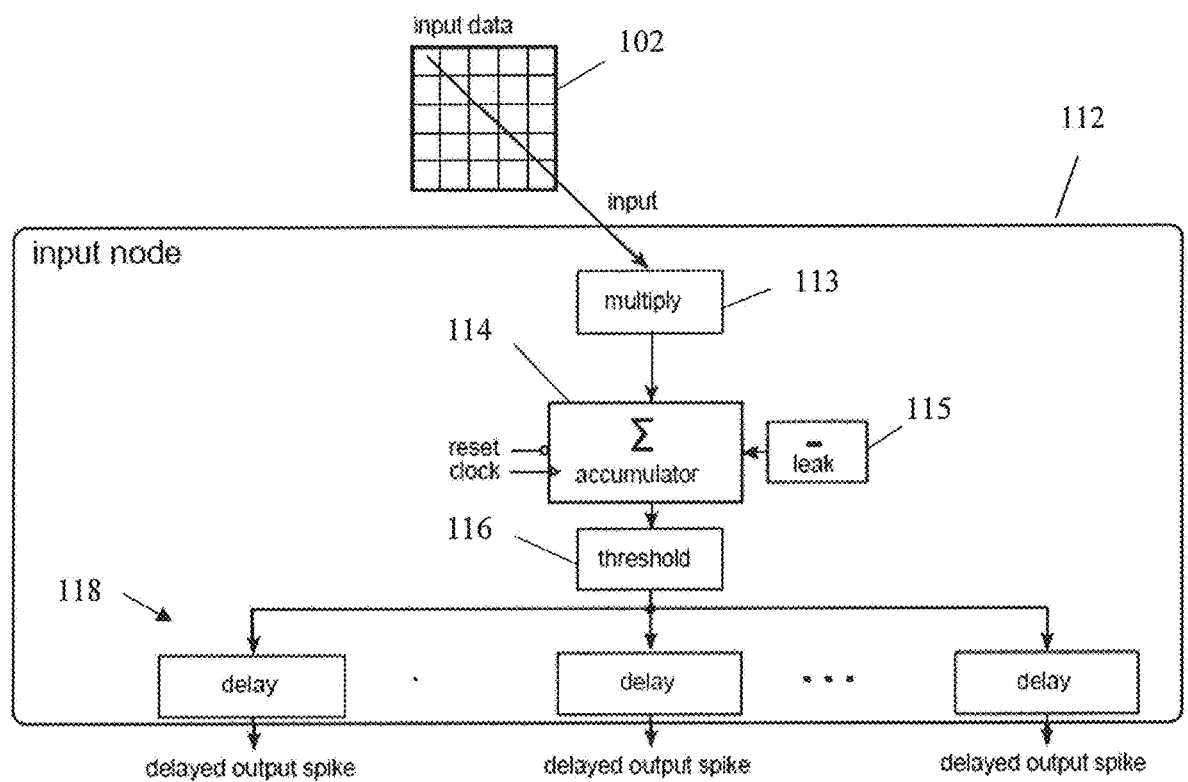
FIG. 12(*a*) is a block diagram showing an input node (here, a spiking LIF neuron) with delayed output.
Figure 12B:
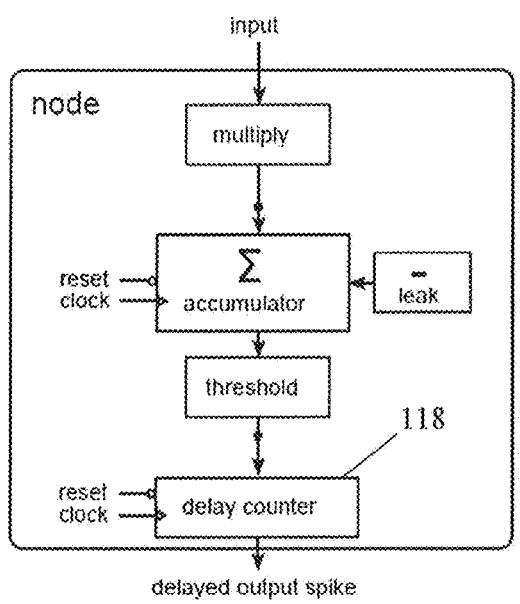
Figure 12C:
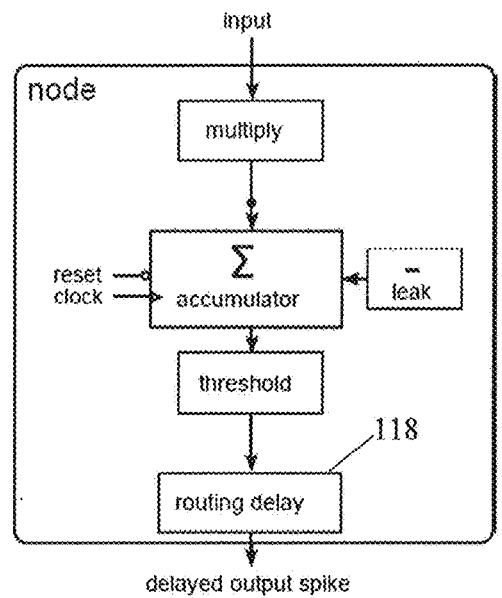
Figure 12D:
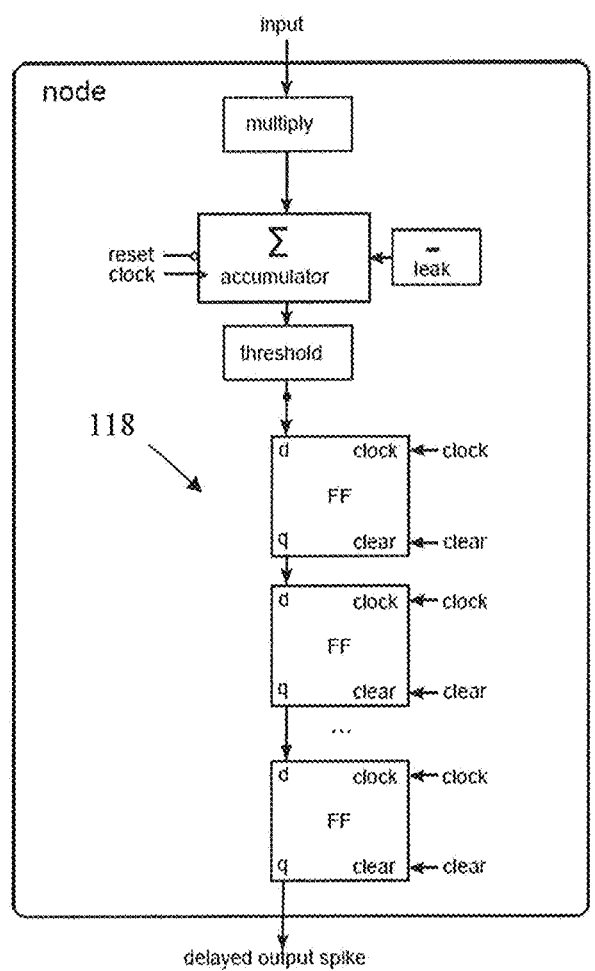

Referring now to FIG. 11, a symmetry detector 100 in accordance with a non-limiting example embodiment of the invention is shown. The symmetry detector 100 is based on spiking neural networks with delay. In the simplest form, the detector 100 has two layers of nodes, an input layer 110 and an output layer 120. Every input node 112 in the input layer 110 corresponds to one pixel in the input image 102. Likewise, every output node 122 in the output layer 120 corresponds to one pixel in an output image that is the same size as the input image. Accordingly, each input node 112 is coupled to the input image, and each output node 122 is coupled to the output image. For example, as shown, the first input node 112a is associated with the first pixel of the input image, the second input node 112b is associated with the second pixel of the input image, and so forth. Likewise, the first output node 122a is associated with the first pixel of the output image, the second output node 122b is associated with the second pixel of the output image, and so forth.

In one embodiment of the invention, the network of connections between the input layer 110 and the output layer 120 is a fully-connected graph (N×N) such that each node 112 in the input layer has a connection to every node 122 in the output layer—though in other embodiments of the invention, not every input node 112 has a connection to every output node 122. However, eliminating connections will contribute to the noise of the detected symmetry by reducing the number of the equidistant data points that are detected in the same manner that adding noise to the delay as shown in FIG. 10(a-g) with low noise shown in FIG. 10(a) and increasing noise shown in FIG. 10(b-g). As connections are eliminated the symmetry detected at the output will eventually blur as shown in FIG. 10(g) such that only highly symmetric data is detected. At some point, continuing to eliminate connections will result in the symmetry not being distinguishable from the noise. Delay is placed on each connection between the input layer 110 and output, layer 120 with a magnitude proportional to the distance separating the input pixel and output pixel in the image space. For example, in 2D Euclidean space this is d= $\sqrt{(x_{input}-x_{output})^2+(y_{input}-y_{output})^2}$. Thus, for example, the delay can be at the output of the input nodes 112, or at the input of the output nodes 122.

The input layer 110 is clocked such that all input nodes 112 that have a value above a threshold at their input pixel fire a single spike simultaneously. All input nodes 112 that do not have an input above threshold do not fire a spike. The spikes propagate across the network, each delayed by the corresponding output delay, and arrive at the output nodes 122.

Due to the proportionality between delay and distance in the image space, spikes that arrive at the same time at the output node 122 in the neural network, are equidistant to the output pixel in image space. The greater the number of equidistant input pixels that exist to a given output pixel, the greater the symmetry density of the output pixel in the image space.

The output image in FIG. 11 is a binary threshold of the density. This is identical to the right-hand column of FIG. 9. If the density value is above the threshold, the output will exist at that point, otherwise it will not. The raw density is shown in FIGS. 6-8, 10.

In one embodiment of the invention, the network is a neural network and each node 112, 122 in the network is a spiking neuron with delay. Spiking neural networks output their signal as a sequence of short spikes or pulses. Spikes are an ideal way to communicate information efficiently in a noisy environment due to their concentration of energy in a short time period producing a high signal to noise ratio at the receiver. The neuron can be implemented in an integrated circuit either using digital logic, where spikes are represented by a binary number, or in analog where spikes are represented by a voltage pulse.

Figure 13:
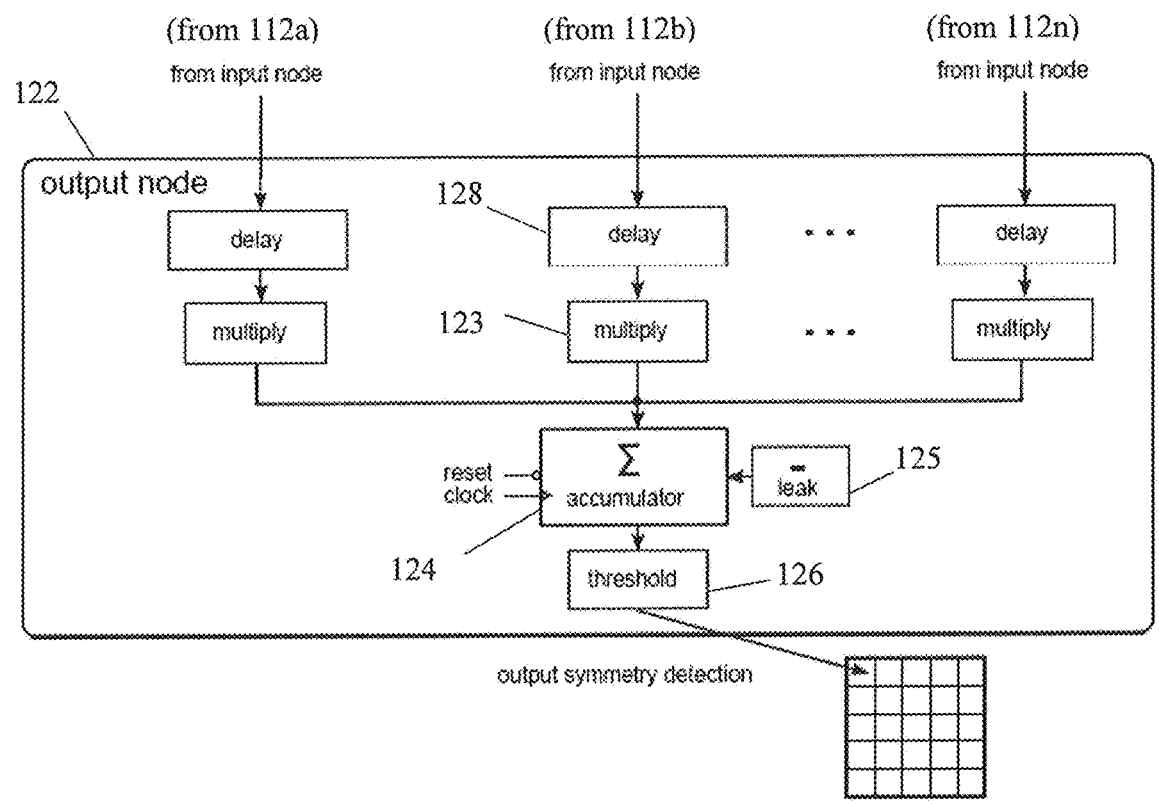
FIG. 13 is a block diagram showing an output node (here, a spiking LIF neuron) with delayed input.

FIGS. 12(a)-12(d) show example non-limiting embodiments of a spiking input node 112 of FIG. 11, and FIG. 13 is a non-limiting example of the output node 122 having multiple inputs (from 112a, 112b, 112n). Starting with FIG. 12(a), the input node 112 is a leaky integrate and fire (LIF) neuron. The node 112 receives input data from the input image 102. The input node 112 has a spike producer/generator or spike producing device that produces spiked data based on the input data 102. In the example embodiment of FIG. 12(a), the spike producer includes a multiplier 113, accumulator 114, leak input 115, and threshold detector 116. It is noted that the multiplier is optional and need not be provided or need not be part of the spike producer. In fact, at the input the spike producer could be just a threshold from the input pixel, where the spike producer produces a spike when the input pixel is over the threshold.

In the embodiment shown, a multiplier 113 is provided for each input, which multiplies the input data 102 by its corresponding weights, though the weight is optional and can be set to 1 for a standard neural network. An accumulator 114 receives the multiplied input data from all of the multipliers 113 and accumulates in time with some leak rate. If the accumulated value is greater than a configurable threshold 116, the LIF neuron causes a spike at the output pulse. The leak 115 lowers the accumulator 114 in time while the multiply 113, input data 102, and accumulate 114 raises the accumulator in time. If the leak 115 is greater than the input data 102 times the multiply value 113, the accumulator will decrease in value. Alternatively, if the input data 102 times the multiplier value 113 is greater than the leak 115, the accumulator 114 will increase in value with time. If the accumulator continues to increase in value it will eventually cross the threshold 116 and produce a spike. Together, the multiply 113, leak 115, and threshold 116 act to configure the input node's sensitivity to the input data value and, consequently, the probability that the input node generates a spike.

All of the inputs are accumulated by the accumulator 114 with a leak 115 until a threshold is passed at the threshold detector 116. Only one output is produced at any clock cycle and represents if the threshold 116 was passed or not. The neuron has one output spike. We split (copy) it N ways following the threshold 116, which in one embodiment for example can be a comparator. The input nodes 112 each have one input and N outputs (where each output is just a splitting/copying of the thresholder output) with delay. The output nodes 122 have N inputs and one output with no delay.

In the symmetry detector 100 (FIG. 11), delay is added to account for the variable distance in the input data space in terms of time. The amount of delay between the input nodes 112 and the output nodes 122 is proportional to the distance in the data space between the input nodes 112 and the output nodes 122. The specific delay will be a function of the size of the input image, the resolution of symmetry we wish to detect, and the response time of each neuron. As a result, for example, if there is a large distance in the data space between the last (or $n^{th}$) input node 112n and the first output node 122a, and a small distance in the data space between the first input node 112a and the first output node 122a, it must take longer for the output from the last input node 112n to reach that output node 122a than it will take for the output from the first input node 112a to reach that output node 122a. Thus, the system 100 introduces a respective delay at some point in the system between the input nodes 112 and the output nodes 122. In the example therefore, there would be a larger delay introduced by the delay device (either at the input node and/or the output node) between the last input node 112n and the first output node 122a and a smaller delay (or no delay) between the first input node 112a and the first output node 122a. The delay is configured so that the data from the input nodes 112 are simultaneously processed by the output nodes 122 if they are equidistant in the data space. Accordingly, input image data that is all the same distance apart from the output node will all arrive at the output node at substantially the same time, which will cause the output node to spike.

This can be accomplished, as shown in FIG. 12(*a*), by providing a delay device 118 at the output of the input node 112 to add a delay to the output from the threshold device 116. Alternatively or in addition, a delay device 128 can be provided at the input of the output node 122, as shown in FIG. 13. Still further, it will be recognized that delay can be introduced at any point between the input node 112 and the output node 122, such as on the communication lines.

As shown in FIG. 12(*a*), a separate delay device 118 is provided for each output from the input node 112 that goes to each of the output nodes 122. In the example embodiment shown, the leftmost delay device 118 can send a delayed spiked input data to the first output node 122a, the middle delay device 118 can send a delayed spiked input data to the second output, node 122b, and the rightmost delay device 118 can send a delayed spiked input data to the last output node 122n.

There are various delay devices 118 that can be utilized to add delay to a spiking neural network in digital logic. The delay device 118 can be a delay counter (FIG. 12(*b*)), a routing delay (FIG. 12(*e*)), and/or a set of shift registers (FIG. 12(*d*)). Referring first to FIG. 12(*d*), the shift register is composed of back-to-back flip-flops (FF). For N clock-cycle of required delay, N flip-flop are added to the output of the neuron. The first FF accepts a binary input from the output of the thresholder. A one represents the spike having fired in that clock cycle and a 0 represents no spike in that clock cycle. Each following FF will accept an input from the previous FF on each clock cycle, delaying the propagation of the spike by one clock cycle. This is a standard LIF neural network.

In FIG. 12(*b*), the delay circuit 118 adds counters to each output. The counters are reset at the beginning of the symmetry detection. If the neuron produces a spike, the counter is reset to its delay value. The counter counts down on each cycle and outputs a spike when it reaches zero. For large delays, this method reduces the number of logic gates over the shift register option (FIG. 12(*d*)) since the delay is represented as a binary number in the counter instead of a delay-proportional number of flip-flops.

FIG. 12(*c*) shows a third non-limiting example embodiment of the invention to implement delay. Here, the delay device 118 is implemented at the integrated circuit component of the input node 112 such that the routing delay is proportional to the required delay. This is the most efficient at runtime since line delay is intrinsic to the integrated circuit. However, this requires the most computational effort when designing the integrated circuit since routing delay is dependent on the placement and layout of all of the components on the integrated circuit.

FIG. 13 shows the output node 122 of FIG. 11. Each of the input nodes 112 have one input from the input data and N outputs with delay, while the output nodes 122 have N inputs from each (or many of) the input nodes 112, and one output with no delay. The output node 122 has similar components to those of the input node 112. For example, the output node 122 has a coincidence detector or coincidence detection device that is formed by a multiplier 123, accumulator 124, leak 125, and threshold detector 126. Here, the multiplier 123, accumulator 124, leak 125, and threshold 126 are similar to the multiplier 113, accumulator 114, leak 115, and threshold 116 of the input node 112. However, the weights for the multiplier 123 can weight closer inputs nodes 112 more strongly and farther input nodes 112 less. This would have the effect of counting nearby symmetry more strongly than distant symmetry.

The output nodes 122 act as coincidence detectors, producing output spikes when a larger number of spikes arrive within a short period of time. The exact period or frequency will depend on several factors including the number of delay steps (i.e., resolution of delay), the response time of the input and output nodes, and the size and resolution of the of the input image.] To do this, the output nodes 122 accumulate the delayed input spikes with a leaky accumulator 124. If the leaky accumulator 124 integrates a value greater than a configurable threshold 126 in a set time, determined by the leak rate, the output node fires by producing an output spike at the output of the threshold detector 126. The likelihood of the output node 122 producing an output spike, then, is proportional to the magnitude of symmetry and is adjustable by configuring the leak rate and threshold. Accordingly, if a large number of delayed spiked input data are received at substantially the same time, the coincidence detector detects that there is symmetry in the input data. Hence, the spike detector of the input node 112 has an accumulator 114 and threshold 116 that detects how sensitive the input node 112 is to the input pixel; whereas the coincidence detector of the output node 122 has an accumulator 124 and threshold 126 that detects how sensitive the output node is to the arrival of the pulses.

It is noted that in the example embodiment of the invention, the input neurons or nodes 112 is one pixel of an image to determine symmetry of the image. It will be appreciated that the neuron or node can be a wide range of elements, components or features, and need not be a pixel. For example, nodes may represent data in a time series where the space in the horizontal axis is time and the vertical axis is stock, weather, or other data over time. The nodes may also represent data in higher dimensional spaces. For example, the three-dimensional points in a point cloud of laser range finding (LIDAR) or three-dimensional magnetic resonance imaging (MRI) data. Nodes may represent data in dimensions higher than three. For example, nodes in an N-dimensional space may be used to find symmetry in clusters of parameters, such as similar movies or music. In addition, in one embodiment of the invention, the nodes 112, 122 can be analog electronic neurons or neuron nodes; however, the nodes can comprise any suitable component. For example, the nodes may be digital logic where the spike is represented as a one bit or the nodes may be optical where the spike is represented as a pulse of light. And, the neurons can be artificial neurons and the neural network can be an artificial neural network.

Photonics

In yet another non-limiting example embodiment of the present invention, the symmetry detector uses integrated photonics. In this embodiment, the pulses are represented as spikes in the amplitude or phase of light traveling in photonic waveguides in an integrated photonic device. Delay between input and output neuron is created by increasing the index of refraction or path length of the photonic waveguides connecting the input and output neurons. The neurons are created from a set of weighting filters, and an optical nonlinear component such as an all-optical-modulator, photodiode-modulator pair, or a LASER. An example of a photonic neural network is discussed in Neuromorphic Photonics, with electro-absorption modulators, by Jonathan K. George et al., Optical Society of America, 2019, the entire contents of which are hereby incorporated by reference.

Figure 15:
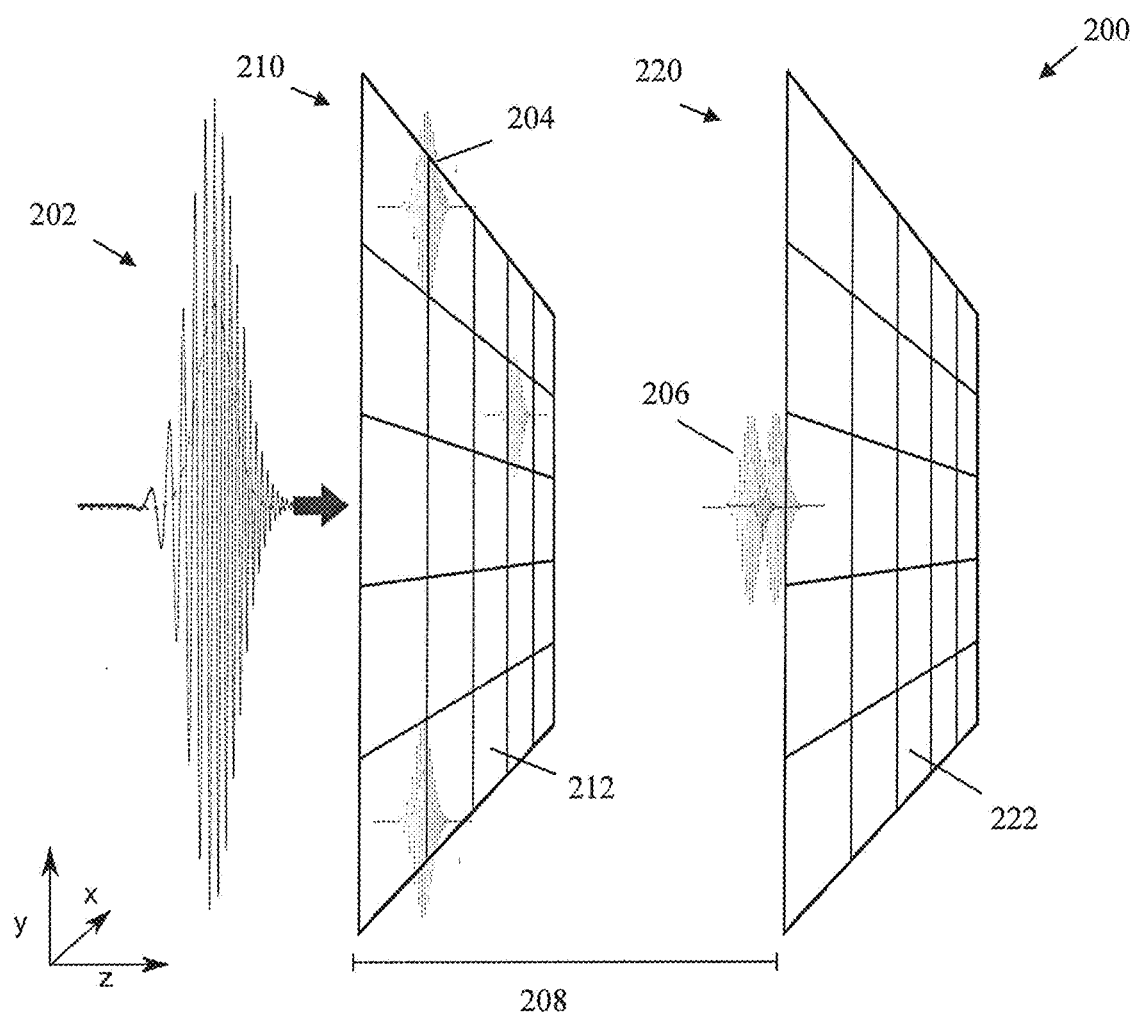
FIG. 15 is a free space optical embodiment of the invention.

Turning to FIG. 15, another non-limiting example of the invention is shown, where the symmetry detector 200 uses optical pulses in free-space optics to represent the pulses of the spiking artificial neural network. As shown, the detector 200 has an optical modulator array 210, and a detector array 220. The modulator array 210 is separated from the detector array 220 by a distance 208. In the example embodiment shown, the modulator array 210 is in a first plane and the detector array 220 is in a second plane that is substantially parallel to the first plane. In addition, the light pulse 202 arrives substantially perpendicular to the first plane, and propagates through so that the delayed optical pulse 206 is substantially perpendicular to the second plane.

Pulses of the input layer are produced by the planar array of modulators 210 and detected by a detector array 220 separated by a small distance 208 from the modulator array 210. Each modulator 210 is connected to a single pulsed laser source, such as a picosecond or femtosecond laser source. A light pulse 202 from the source arrives at the back surface of the planar modulator array 210, or is routed through the array with photonic waveguides, such that the pulses leave the modulator array 210 at identical times. The modulators 210 are set to modulate the light proportional to the input, data at each grid or location 212 in the array.

If data exists at an array position 212, the light is allowed through 204. If data does not exist at an array position 212, the light is blocked. In this way a set of optical pulses 204 representing the data exits top of the modulator array 210. Delay in this embodiment is represented as free space optical delay along the propagation length 208. The optical pulses 204 propagate with the speed of light and arrive at the output layer 220. The output layer is created with a detector array 220 formed by a photodiode or CCD at each grid, location or position 222 of the array 220. The noise floor of the detector array 220 is set to model the threshold of the neural network where the noise floor is higher than a single pulse.

Delayed optical pulses 206 arriving simultaneously at the detector 220 in the array will surpass the noise floor of the detector 222 and will be detected. Optical pulses not arriving simultaneously at the detector 222 in the array 220 will not surpass the noise floor of the detector 222 and will not be detected. In this way, symmetry is detected at the output detector array 220.

Noise Results

To evaluate the effect of noise on the network, we simulated the outline of an F-35 aircraft with Gaussian noise added to the length delay with a standard deviation ranging from 1 to 5, as shown in FIG. 10. The results show that small features with narrow bands of coincidence are quickly eliminated while broad ranging symmetry points from across the network increase in dominance. Beginning with a small amount of noise in FIG. 10(a), standard deviation of 1, and adding noise in FIGS. 10(b)-10(f) to end with a significant magnitude, standard deviation of 10, in FIG. 10(g) shows the resistance of the large feature symmetry to the additive noise.

This can be explained by the strict coincidence detection of the network. When two points are pushed away from each other even by a distance of one pixel, the coincidence detection will not happen. In the case of the thin line of symmetry between equidistant lines, for example near the nose of the aircraft, adding noise disperses the boundary between them. Alternatively, in cases where the symmetry is not exact, for example near the tail of the aircraft, adding noise creates new coincidence points as some previously unaligned spikes are now brought into alignment with each other. This demonstrates the value of adding, noise when considering shapes with less strictly defined symmetric features.

CONCLUSION

The symmetry detector of the invention provides a novel system and algorithm for ending a scalar field representing the symmetry of points in a multi-dimensional space. Time synchronization in the input values of spiking neural, networks, with the appropriate choice of threshold and spike period, results in the identification of output neurons along points of high symmetry density to the network inputs. An embodiment of the symmetry detector includes selective LIF neural network in common hardware with a high speed, 2.8 MHz identification of symmetry points in an 8×8 Manhattan metric space.

The symmetry detector uses only the delay and coincidence detecting properties of a single layer of neurons in that spiking neural networks naturally lead to form effective symmetry identifying identification, form effective symmetry identifying systems utilizing only the delay and coincidence detecting properties of a single layer of neurons.

The output of the symmetry detector of the present invention has a wide range of applications. For example, the greater understanding of symmetry perception in artificial intelligences will lead to systems with more effective pattern visualization, compression, and goal setting processes.

Other optical implementations of the presented findings include a) to harness the information parallelism of bosonic photons, b) to capitalize on the high energy efficiency of photonic and nanophotonic optoelectronics which only require the micrometer-small active devices to the electrically addressed enabling 100s of atto-Joule efficient active optoelectronic devices, and (c) to enable high-data throughput links and platforms [12].

The following documents are incorporated herein by reference: (1) Dakin, S. C., Hess, R. F.: The spatial mechanisms mediating symmetry perception. Vision research 37(20), 2915-2930 (1997); (2) Hong, W., Yang, A. Y., Huang, K., Ma, Y.: On symmetry and multiple-view geometry: Structure, pose, and calibration from a single image. International Journal of Computer Vision 60(3), 241-265 (2004); (3) Izhikevich, E. M.: Polychronization: computation with spikes. Neural computation 18(2), 245-282 (2006); (4) Keller, Y., Shkolnisky, Y.: An algebraic approach to symmetry detection. In: IC PR (3), pp. 186-189 (2004); (5) Konig, P., Engel, A. K., Singer, W.: Integrator or coincidence detector? the role of the cortical neuron revisited. Trends in neurosciences 19(4), 130-137 (1996).

(6) Loy, G., Eklundh, J. O.: Detecting symmetry and symmetric constellations of features. In: European Conference on Computer Vision, pp. 508-521. Springer (2006); (7) Marola, G.: On the detection of the axes of symmetry of symmetric and almost symmetric planar images. IEEE Transactions on Pattern Analysis and Machine Intelligence 11(1), 104-108 (1989); (8) Prut, Y., Vaadia, E., Bergman, H., Haalman, I., Slovin, H., Abeles, M.: Spatiotemporal structure of cortical activity: properties and behavioral relevance. Journal of neurophysiology 79(6), 2857-2874 (1998); (9) Reichardt, W.: Autocorrelation, a principle for the evaluation of sensory information by the central nervous system. Sensory communication pp. 303-317 (1961); (10) Sawada, T., Li, Y., Pizlo, Z.: Detecting 3-d mirror symmetry in a 2-d camera image for 3-d shape recovery. Proceedings of the IEEE 102(10), 1588-1606 (2014); (11) Sengupta, B., Stemmler, M. B.: Power consumption during neuronal computation. Proceedings of the IEEE 102(5), 738-750 (2014).

(12) Tait, A. N., Nahmias, M. A., Shastri, B. J., Prucnal, P. R.: Broadcast and weight: an integrated network for scalable photonic spike processing. Journal of Lightwave Technology 32(21), 3427-3439 (2014); (13) Wagemans, J.: Characteristics and models of human symmetry detection. Trends in cognitive sciences 1(9), 346-352 (1997); (14) Zabrodsky, H., Peleg, S., Avnir, D.: Symmetry as a continuous feature. IEEE Transactions on Pattern Analysis and Machine Intelligence 17(12), 1154-1166 (1995); (15) Zhu, T.: Neural processes in symmetry perception: a parallel spatiotemporal model. Biological cybernetics 108(2), 121-131 (2014).

It is further noted that the description and claims use several geometric or relational terms, such as parallel, perpendicular, and perpendicular. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, arrays may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

In addition to the embodiments shown and described, the invention can be implemented by or in combination with a computer or computing device having a processor, processing device or controller to perform various functions and operations in accordance with the invention. The computer can be, for instance, a personal computer (PC), server or mainframe computer. The processor may also be provided with one or more of a wide variety of components or subsystems including, for example, a co-processor, register, data processing devices and subsystems, wired or wireless communication links, input devices, monitors, memory or storage devices such as a database. All or parts of the system and processes can be stored on or read from computer-readable media. The system can include non-transitory computer-readable medium, such as a hard disk, having stored thereon machine executable instructions for performing the processes described.

All or parts of the system, processes, and/or data utilized in the invention can be stored on or read from the storage device(s). The storage device(s) can have stored thereon machine executable instructions for performing the processes of the invention. The processing device can execute software that can be stored on the storage device. For example, the computing device can receive the output from the output nodes or the output image (FIGS. 11-13) or from the detector grid (FIG. 15), and can also be used to control delay between the input nodes and the output nodes. The entire process is conducted automatically by the processor, and without any manual interaction. Accordingly, unless indicated otherwise the process can occur substantially in real-time without any delay or manual action.

Within this specification, the various sizes, shapes and dimensions are approximate and exemplary to illustrate the scope of the invention and are not limiting. The sizes and the terms "substantially" and "about" mean plus or minus 15-20%, or in other embodiments plus or minus 10%, and in other embodiments plus or minus 5%, and plus or minus 1-2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

The foregoing description and drawings should be considered as illustrative only of the principles of the invention. The invention also includes the method of symmetry detecting. The invention may be configured in a variety of shapes and sizes and is not intended to be limited by the embodiment. In addition, the statements made with respect to one embodiment apply to the other embodiments, unless otherwise specifically noted. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A symmetry detector to detect symmetry of input data, said symmetry detector comprising:
   a plurality of input nodes, each input node receiving a discrete data point of the input data, each input node representing a data point at a fixed position in an N dimensional metric space, and having a spike producer configured to produce spiked data as a threshold of the input data and delay devices configured to delay the produced spiked data by a fixed time constant representing distance in the metric space and provide delayed output data; and a plurality of output nodes, each output node connected to one or more of the plurality of input nodes, each output node representing output data at a fixed position also in the same N dimensional metric space as the input nodes, receiving the delayed output data, from each of the connected one or more plurality of input nodes, where each delay is constant and set proportionally to the distance in the metric space between the input node and the output node, and each output node having a coincidence detector configured to detect symmetry based on delayed output data that is spiked.

2. The symmetry detector of claim 1, said plurality of input nodes and said plurality of output nodes each comprising a neuron.

3. The symmetry detector of claim 1, said coincidence detector comprising a plurality of multipliers each configured to multiply the delayed output data from each of the connected one or more said plurality of input nodes by a corresponding weight value, an accumulator configured to receive and accumulate the multiplied delayed output data and a threshold detector configured to detect a threshold number of spiked data in the accumulated multiplied delayed output data.

4. The symmetry detector of claim 1, wherein the threshold number represents symmetry of input data.

5. The symmetry detector of claim 1, said spike producer comprising a multiplier configured to multiply the input data by a corresponding weight value, an accumulator configured to receive the multiplied input, a threshold detector configured to detect spiked data in the input data and provide the detected spiked input data.

6. The symmetry detector of claim 5, said accumulator having leak configured to adjust the sensitivity of the output node to detecting symmetry.

7. The symmetry detector of claim 1, said delay device comprising a set of clocks, or a delay counter, or a routing delay.

8. The symmetry detector of claim 1, wherein the delay is proportional to a distance between each respective input node and each respective output node, in the data space.

9. A symmetry detector to detect symmetry of input data, said symmetry detector comprising:

a plurality of input nodes, each input node receiving a discrete data point of the input data, each input node representing a data point at a fixed position in an N dimensional metric space, and having a spike producer configured to produce spiked data by a fixed time constant representing distance in the metric space as a threshold of the input data; and a plurality of output nodes, each output node connected to one or more of the plurality of input nodes, each output node representing output data at a fixed position also in the same N dimensional metric space as the input nodes, receiving the input node output data from each of the one or more connected plurality of input nodes, each output node having a delay device delaying the input node output data to provide a delayed input node output data, where each delay is constant and set proportionally to the distance in the metric space between the input node and the output node, and each output node having a coincidence detector configured to detect a threshold number of spikes in the delayed input node output data in a given period of time.

10. The symmetry detector of claim 9, said plurality of input nodes and said plurality of output nodes each comprising a neuron.

11. The symmetry detector of claim 9, said coincidence detector comprising an accumulator configured to receive and accumulate the delayed input node output data and a threshold detector coupled to the accumulator configured to identify the threshold number of spikes.

12. The symmetry detector of claim 11, said accumulator having leak configured to adjust the sensitivity of the output node to detecting symmetry.

13. The symmetry detector of claim 9, wherein the threshold number represents symmetry of input data.

14. The symmetry detector of claim 9, said delay device comprising a set of clocks, or a delay counter, or a routing delay.

15. The symmetry detector of claim 1, the spiked data comprising a temporal pulse.

* * * * *